3,394,398
FLUORINATED HEMI-KETALS
Roger L. Pierpont, Westfield, and Edmund J. Rumanowski, Dover, N.J., assignors to Allied Chemical Corporation, New York, N.Y., a corporation of New York
No Drawing. Filed Apr. 13, 1964, Ser. No. 359,510
2 Claims. (Cl. 260—613)

This invention relates to certain fluorinated hemi-ketals, their method of preparation, and their use as herbicides.

In accordance with this invention it has been found that hemi-ketals of perhaloacetones containing from two to six fluorine substituents, the remaining substituents being chlorine, and halophenoxyethanols containing from one to five halogen substituents can be prepared in good yield by reacting the perhaloacetone with the halophenoxyethanol, preferably in an appropriate solvent.

Perhaloacetones containing from two to six fluorine substituents, the remaining substituents being chlorine, are known compounds and those commercially available include $F_3CCOCF_2Cl$, $F_2ClCCOCF_2Cl$, $F_2ClCCOCFCl_2$, $FCl_2CCOCFCl_2$ and $F_3CCOCF_3$.

Halophenoxyethanols containing from one to five halogen substituents are known compounds and include 2,4-dichlorophenoxyethanol, 2,4,5 - trichlorophenoxyethanol, 2-chloro - 4-fluorophenoxyethanol, 4-chlorophenoxyethanol, 2,4-dibromophenoxyethanol, and the like. Preferably the halogen substituents are chlorine, fluorine or bromine.

The hemi-ketals produced in accordance with this invention are thus of the class

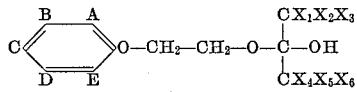

wherein at least two of $X_1$, $X_2$, $X_3$, $X_4$, $X_5$ and $X_6$ are fluorine, the remaining X's each being either fluorine or chlorine, and A, B, C, D and E are each hydrogen or halogen, at least one of A, B, C, D and E being halogen.

Any solvent inert to the reactants and reaction product may be employed in carrying out the method of this invention. Representative solvents include tetrahydrofuran; isopropylether; 1,4-dioxane; and dialkylethers of ethylene glycol containing one or two carbon atoms in each alkyl radical, for example, ethylene glycol dimethyl ether, ethylene glycol diethyl ether and the like.

The reaction is exothermic. The reaction temperature used is not critical and can range from $-20°$ C. up to $100°$ C. Reaction temperatures above and below this range are also suitable. It is preferable gradually to add the perhaloketone to a solution of the other reactant in the solvent so as to control the temperature rise. The ratio of reactants can vary widely but generally is the range of 0.5 to 2 moles of the perhaloacetone per mole of the other reactant. The ratio of inert solvent to the perhaloacetone can also vary widely, generally being in the range of about 500 to 1500 milliliters of solvent per gram mole of the perhaloacetone.

The hemi-ketals of this invention are useful as contact and pre-emergence weed killers. When the hemi-ketals are used for this purpose, they are advisably used at a dosage level of about one to fifteen pounds per acre.

The following examples illustrate in detail the method of the invention.

Example I

Hexafluoroacetone in the amount of 21.0 grams (0.13 mole) was added to 20.7 grams of 2,4-dichlorophenoxyethanol (0.1 mole) dissolved in 100 milliliters of tetrahydrofuran contained in a three-neck flask equipped with a gas inlet, stirrer, thermometer and condenser over a 12 minute period at 25° to 40° C. The mixture was stirred for 15 minutes as it cooled from 40° C. to 30° C. After evaporating the tetrahydrofuran solvent by air blowing, the mass was dried and 30 grams of the product

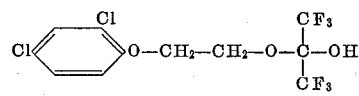

was obtained having a melting point of 92°–94° C. The yield was 80% based on the 2,4-dichlorophenoxyethanol.

Analysis for above product: Theory C, 35.4%; H, 2.14%. Found C, 35.3%; H, 2.19%.

Example II

Hexafluoroacetone in the amount of 16.6 grams (0.1 mole) was added to 20.7 grams of 2,4-dichlorophenoxyethanol (0.1 mole) in the same type of equipment as in Example I over a 150 minute period at 60° to 70° C. The mixture was stirred for 60 minutes at 72° to 75° C. The mass was cooled and filtered to give 34 grams of solid with a melting point of 67° to 92° C. The solid was recrystallized using 100 milliliters of boiling hexane, and dried to give 23 grams of the product of Example I with a melting point of 87° to 91° C.

As indicated above, the hemi-ketals of this invention are useful as herbicides in combatting undesired vegetation. Not only do these compounds control the broad leaf or dicotyledonous varieties of plants such as smartweed, rape, lamb's-quarters, bindweed, horse nettle and Canada thistle, which commonly grow wild in agricultural and other soils, but also the more pernicious monocotyledonous plants or grasses such as rye grass, foxtail, crab grass and nut grass, which also commonly appear in such soils.

The hemi-ketals may be applied directly to the vegetation to be treated. However, for reasons fo economy and to achieve greater uniformity of application, it is preferred to incorporate the active ingredient in liquid or solid diluents. Outstanding results may be attained by employing as the diluent liquids in which the herbicide is soluble or dispersible.

The liquid diluent may be a solvent for the active ingredient or the active ingredient may be dispersed in the liquid diluent. Hence the hemi-ketals can be conveniently formulated as a water-dispersible powder or as emulsifiable concentrates and dilute solutions in the organic hydrocarbon solvents. Typical organic hydrocarbon solvents include fuel oils, petroleum naphthas, etc. The solutions or dispersions should contain the active ingredient in an amount not less than ½ of a pound per 100 gallons of dispersion or solution, the more usual concentrations being in the range of 1 to 2 pounds per 100 gallons of dispersion or solution.

As indicated above, the active ingredient may be impregnated on a suitable solid diluent. Typical diluents, which may be a finely divided or granular form, include diatomaceous earth, wood flours and silica gels. The dusts may contain as little as about 0.5% by weight of active ingredient.

Various conventional wetting, dispersing and emulsifying agents may be added to the herbicidal formulations of the type described in order to enhance the wetting effect and produce improved dispersion of the active ingredient on the vegetation to which it is applied.

Any of the known types of spraying or dusting apparatus may be employed for applying the herbicide to the vegetation to be treated, a primary consideration being uniformity of application.

The herbicides of the present invention are applied to the area to be treated in amount (pounds per acre) sufficient to afford the degree of control of vegetation desired in the given area. The optimum intensity of application of the desired herbicide will depend on such factors as amount of vegetation in the area, degree of permanency of plant eradication desired, type of plants growing in the area, and climatic conditions. Hence, as is well known to those skilled in the art, the rate of application actually used will depend largely on prevailing local conditions. In most instances, effective control of germinating weed seeds and small weed seedlings may be realized by applying the herbicide at an overall rate greater than about ½ pound per acre. Where prolonged non-selective control or established vegetation is desired, dosages greater than about 4 pounds per acre are employed.

The following example is illustrative of the herbicidal activity of the compounds of the present invention.

Test plots were seeded with monocotyledonous and dicotyledonous weed plants, as well as with monocotyledonous and dicotyledonous crop plants. These plants include:

Monocotyledonous Plants
rye grass

Monocotyledonous Crops
wheat
field corn

Dicotyledonous Plants
rape

Dicotyledonous Crops
soybeans
cotton

Four formations comprising the product of Example I in amounts of 2, 4, 8 and 16 pounds respectively each dissolved in 40 gallons of acetone were applied to 4 similar test plots at the rate of 40 gallons of solution per acre within one day of seeding. A check test plot was treated with acetone applied at the rate of 40 gallons per acre and another check test plot remained untreated. The treated test plots, in a greenhouse, were watered by sub-irrigation and after a 16 day observation period they were rated using three indices, injury rating (IR), height reduction (HR) and percent mortality (PK). The injury rating indexes based on a scale of 0 to 10, 0 meaning no apparent injury; 1, 2 or 3 slight injury; 4, 5 or 6 moderate injury; 7, 8 or 9 severe injury, plants will die; and 10, all plants dead. The height reduction index is obtained by calculating the average height in inches of the treated plants as a percentage of the average height of untreated plants. The percent mortality is obtained by counting the number of plants in treated plots and expressing the result as a percent mortality when compared to the untreated plot. The following data were obtained.

|  | Application Rate, Pounds Per Acre | | | | Acetone | Blank |
|---|---|---|---|---|---|---|
|  | 2 | 4 | 8 | 16 |  |  |
| Corn: |  |  |  |  |  |  |
| IR | 1 | 2 | 3 | 1 | 0 | 0 |
| Percent HR | 0 | 11 | 6 | 2 | 0 | 0 |
| Percent PK | 10 | 5 | 20 | 8 | 0 | 0 |
| Cotton: |  |  |  |  |  |  |
| IR | 0 | 7 | 7 | 3 | 0 | 0 |
| Percent HR | 0 | 41 | 25 | 30 | 0 | 0 |
| Percent PK | 0 | 28 | 46 | 20 | 0 | 0 |
| Wheat: |  |  |  |  |  |  |
| IR | 5 | 6 | 6 | 2 | 0 | 0 |
| Percent HR | 14 | 7 | 33 | 7 | 0 | 0 |
| Percent PK | 40 | 55 | 58 | 10 | 0 | 0 |
| Soybeans: |  |  |  |  |  |  |
| IR | 2 | 5 | 4 | 6 | 0 | 0 |
| Percent HR | 13 | 9 | 19 | 43 | 0 | 0 |
| Percent PK | 6 | 0 | 25 | 33 | 0 | 0 |
| Ryegrass: |  |  |  |  |  |  |
| IR | 6 | 9 | 9 | 9 | 0 | 0 |
| Percent PK | 60 | 90 | 85 | 85 | 0 | 0 |
| Rape: |  |  |  |  |  |  |
| IR | 9 | 9 | 10 | 10 | 0 | 0 |
| Percent PK | 98 | 98 | 100 | 100 | 0 | 0 |

These results demonstrate that the hemi-ketal of Example I, a compound typical of those embraced by the present invention, is active as a pre-emergency herbicide on both dicotyledonous and monocotyledonous plants. In addition, at an application rate of 4 to 16 pounds per acre, the hemi-ketal of Example I gave only slight or moderate injury to crops, except for cotton, and hence the compounds of the invention can advantageously be employed as selective pre-emergence herbicides.

Post-emergence tests were carried out using the formulations described above applied at rates of 2, 4 and 8 pounds per acre on test plots eight to ten days after seeding. After an observation period of 12 days, the test plots were given an injury rating as shown below.

|  | Application Rate, Pounds per Acre | | | Acetone | Blank |
|---|---|---|---|---|---|
|  | 2 | 4 | 8 |  |  |
| Corn | 1 | 1 | 5 | 0 | 0 |
| Cotton | 2 | 9 | 10 | 0 | 0 |
| Wheat | 4 | 5 | 6 | 0 | 0 |
| Soybeans | 4 | 8 | 9 | 0 | 0 |
| Ryegrass | 1 | 2 | 3 | 0 | 0 |
| Rape | 5 | 8 | 10 | 0 | 0 |

The embodiments of the invention in which an exclusive property or privilege is claimed are defined as follows:

1. The compounds of the class

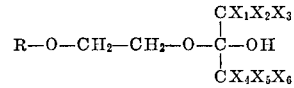

wherein $X_1$, $X_2$, $X_3$, $X_4$, $X_5$, and $X_6$ are each selected from the group consisting of chlorine and fluorine, at least two of $X_1$, $X_2$, $X_3$, $X_4$, $X_5$, and $X_6$ being fluorine, R is a halo-substituted phenyl radical selected from the group consisting of 2,4-dichlorophenyl, 2,4,5-trichlorophenyl, 2-chloro-4-fluorophenyl, 4-chlorophenyl, and 2,4-dibromophenyl.

2. The compound of the formula

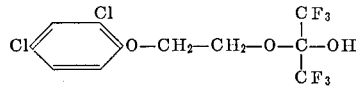

References Cited

UNITED STATES PATENTS 2,712,991  7/1955  Swezey _____ 260—613 XR
2,249,111  7/1941  Bruson _____ 260—613
2,266,737  12/1941 Bruson et al. _____ 260—613
3,063,821  11/1962 Weil _____ 71—2.3
3,107,993  10/1963 Schaeffer et al. _____ 71—2.3

OTHER REFERENCES

Knunyants et al., Chemical Abstracts, vol. 54 (1960), pages 22, 484–22, 485.

BERNARD HELFIN, *Primary Examiner.*